United States Patent
Peng et al.

(10) Patent No.: US 9,185,377 B1
(45) Date of Patent: Nov. 10, 2015

(54) COLOR PROCESSING SYSTEM AND APPARATUS

(71) Applicant: Himax Imaging Limited, Tainan (TW)

(72) Inventors: Yuan-Chih Peng, Tainan (TW);
Dong-Long Lin, Tainan (TW);
Po-Chang Chen, Tainan (TW)

(73) Assignee: Himax Imaging Limited, Tainan (TW)

( * ) Notice: Subject to any disclaimer, the term of this patent is extended or adjusted under 35 U.S.C. 154(b) by 0 days.

(21) Appl. No.: 14/316,568

(22) Filed: Jun. 26, 2014

(51) Int. Cl.
| | |
|---|---|
| *H04N 9/083* | (2006.01) |
| *H04N 3/14* | (2006.01) |
| *H04N 5/335* | (2011.01) |
| *H04N 9/04* | (2006.01) |
| *H04N 9/73* | (2006.01) |
| *H04N 5/33* | (2006.01) |
| *H04N 9/64* | (2006.01) |

(52) U.S. Cl.
CPC .............. *H04N 9/735* (2013.01); *H04N 5/33* (2013.01); *H04N 9/045* (2013.01); *H04N 9/646* (2013.01)

(58) Field of Classification Search
CPC .................. H04N 2209/045; H04N 2209/046; H04N 5/3458; H01L 27/14621
USPC ....................... 348/273–279, 222.1
See application file for complete search history.

(56) References Cited

U.S. PATENT DOCUMENTS

| | | | | |
|---|---|---|---|---|
| 8,723,995 | B2* | 5/2014 | Schweng et al. | 348/276 |
| 8,922,683 | B2* | 12/2014 | Hayashi et al. | 348/275 |
| 2008/0093533 | A1* | 4/2008 | Onodera | 250/208.1 |
| 2008/0218597 | A1* | 9/2008 | Cho | 348/222.1 |
| 2009/0086068 | A1* | 4/2009 | Hagiwara et al. | 348/294 |
| 2011/0228097 | A1* | 9/2011 | Motta | 348/164 |
| 2011/0304753 | A1* | 12/2011 | Shintani | 348/279 |
| 2012/0092535 | A1* | 4/2012 | Masuno et al. | 348/278 |
| 2012/0176513 | A1* | 7/2012 | Hirose | 348/234 |
| 2014/0009662 | A1* | 1/2014 | Toda et al. | 348/336 |
| 2014/0078355 | A1* | 3/2014 | Hiramoto et al. | 348/273 |
| 2015/0109498 | A1* | 4/2015 | Aoki et al. | 348/280 |
| 2015/0124129 | A1* | 5/2015 | Aoki et al. | 348/280 |

* cited by examiner

*Primary Examiner* — Chia-Wei A Chen
(74) *Attorney, Agent, or Firm* — Donald E. Stout; Stout, Uxa & Buyan, LLP

(57) ABSTRACT

A color processing system includes a color interpolation unit coupled to receive color and white (W) signals and accordingly generate interpolated white signals and difference signals; a color correction unit configured to correct the difference signals, thereby resulting in corrected color signals; and a sensitivity control unit configured to generate adjusted color signals according to the corrected color signals, the interpolated white signals, and surrounding illumination.

17 Claims, 6 Drawing Sheets

| B0 | W1 | B2 | W3 |
| G4 | R5 | G6 | R7 |
| B8 | W9 | B10 | W11 |
| G12 | R13 | G14 | R15 |

COLOR PROCESSING SYSTEM AND APPARATUS

BACKGROUND OF THE INVENTION

1. Field of the Invention

The present invention generally relates to color processing, and more particularly to a color processing system and apparatus adaptable to illumination.

2. Description of Related Art

An image sensor, such as a complementary metal-oxide-semiconductor (CMOS) image sensor, is a device that converts an optical image into electronic signals. The image sensor has been widely used in a variety of applications such as cell phones and cameras. The image sensor, in general, can convert visual light but also infrared light, which however causes discoloring phenomenon. As a result, an infrared band-stop filter is usually applied before the image sensor to block the infrared light.

Sensitivity is an important parameter that characterizes efficiency of the image sensor. The sensitivity of the CMOS image sensor, for example, is commonly limited to area of photo sensors that compose the image sensor. As the density of the image sensor increases, sensitivity thus decreases.

In a low-light condition, the unwanted infrared light mentioned above may become desirable, for example, in a surveillance system, to increase visibility. U.S. Pat. No. 7,239,344, entitled "Camera and device for switching optical filters," the disclosure of which is hereby incorporated by reference, discloses a scheme in which two optical filters are switched by a motor according to illumination. In day light, a normal IR-cut filter is used to block the infrared light to avoid discoloring; in a night mode, another optical filter is applied to pass the infrared light. This scheme, however, consumes substantial power and reduces lifetime of an imaging device such as a camera.

U.S. Pat. No. 8,408,821 entitled "Visible and infrared dual mode imaging system," the disclosure of which is hereby incorporated by reference, discloses a dual-band filter that passes visible light band and an infrared light band centered at 950 nm. However, an infrared light source is required, in a night mode, to emit infrared light that may be captured by the infrared light band of the dual-band filter. In day light, there is still infrared light passed by the infrared light band, which causes discoloring.

U.S. Pat. No. 7,864,233 entitled "Image photographing device and method," the disclosure of which is hereby incorporated by reference, discloses a color filter array (CFA) that contains, among others, a filter passing visible plus infrared light band and another filter passing visual light band. Infrared band may then be calculated by the difference between the sensed signals of the two filters mentioned above, and may then be used to avoid the discoloring. In this scheme, more processing is required to filter out infrared signals, and sampling rate is substantially reduced.

U.S. Pat. No. 8,619,143 entitled "Image sensor including color and infrared pixels," the disclosure of which is hereby incorporated by reference, discloses a scheme that uses a notch type IR-cut filter that blocks a transition band between the visible light band and the infrared band. This scheme, however, suffers low sensitivity in low-light condition.

U.S. Pat. No. 8,508,633 entitled "Image device with color and brightness signal processing," the disclosure of which is hereby incorporated by reference, discloses a scheme that uses complementary color (e.g., W–R) of image pipelines as a color filter array (CFA). As color filter spectral response depends on material used, the response therefore may not be easily acquired or optimized. Moreover, in this scheme, white pixel value is directly used as a brightness signal, therefore causing color reproduction error, especially in color saturation.

For the foregoing reasons, a need has thus arisen to propose a novel color processing system for overcoming disadvantages of the conventional color processing systems.

SUMMARY OF THE INVENTION

In view of the foregoing, it is an object of the embodiment of the present invention to provide a color processing system and apparatus adaptable to illumination such that discoloring phenomenon in normal light condition may be avoided and visibility in low-light condition may be substantially increased.

According to one embodiment, a color processing system includes a color interpolation unit, a color correction unit, and a sensitivity control unit. The color interpolation unit receives color and white (W) signals and accordingly generates interpolated white signals and difference signals. The color correction unit corrects the difference signals, thereby resulting in corrected color signals. The sensitivity control unit generates adjusted color signals according to the corrected color signals, the interpolated white signals, and surrounding illumination.

DETAILED DESCRIPTION OF THE INVENTION

Figure 1:
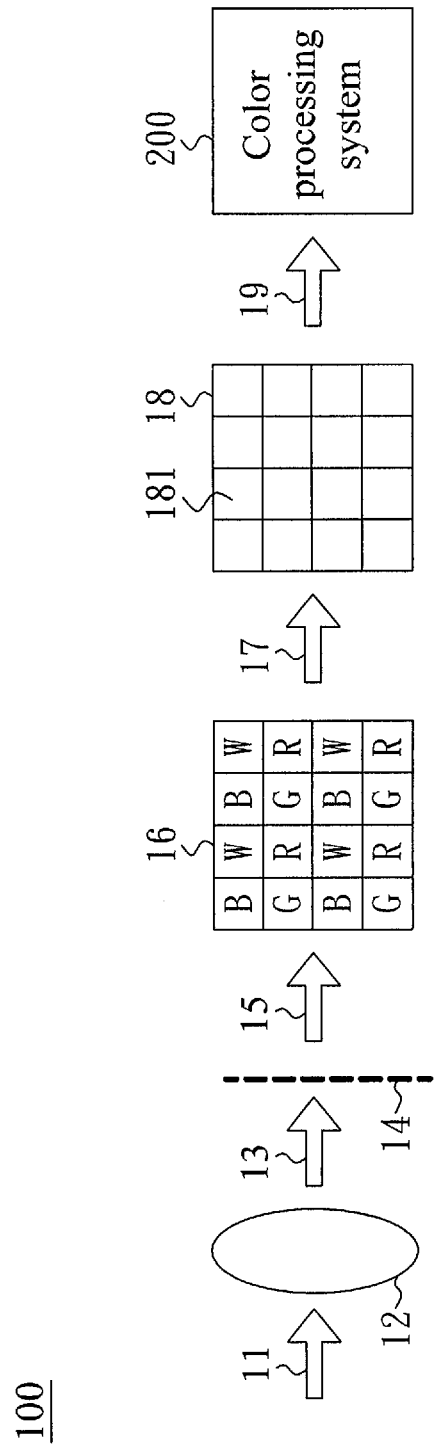
FIG. 1 shows a schematic diagram illustrated of a color processing apparatus according to one embodiment of the present invention.

FIG. 1 shows a schematic diagram illustrated of a color processing apparatus 100 according to one embodiment of the present invention. As shown in the figure, an incident light 11 is first transmitted through a lens 12, which, for example, converges or focuses the incident light 11 to be a transmitted light 13. The transmitted light 13 is then filtered by an infrared cut-off filter (sometimes abbreviated as IR-cut filter or IR filter) 14, which passes visible wavelengths (e.g., 380-700 nm) and infrared wavelengths (e.g., near-infrared ranging between 700-1000 nm) while blocking other wavelengths. The IR-cut filtered light 15 from the IR-cut filter 14 is then subjected to a color and white filter array (filter array hereinafter) 16, which is composed of color filters or chromatic filters (such as red (R) filters, green (G) filters and blue (B)

filters) that filter the IR-cut filtered light 15 by respective wavelength range, and white (W) filters or panchromatic filters that pass, or is transparent to, the IR-cut filtered light 15. The R filters, G filters, B filters and W filters of the filter array 16 may be arranged in, but not be limited to, a manner shown in FIG. 1. Although the color filters are exemplified in the embodiment by R, G and B filters in an RGB color model, other color model such as cyan (C), magenta (M) and yellow (Y) (or CMY) color model may be adopted instead.

Figure 2A:
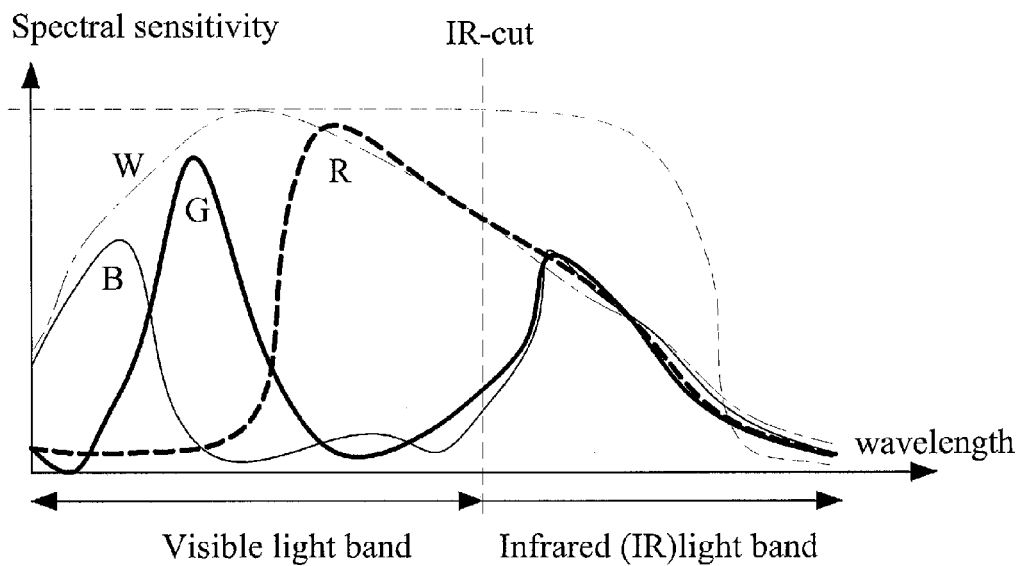
FIG. 2A shows one exemplary wavelength spectrum illustrating spectral sensitivity of R/G/B and W lights from the filter array of FIG. 1.
Figure 2B:
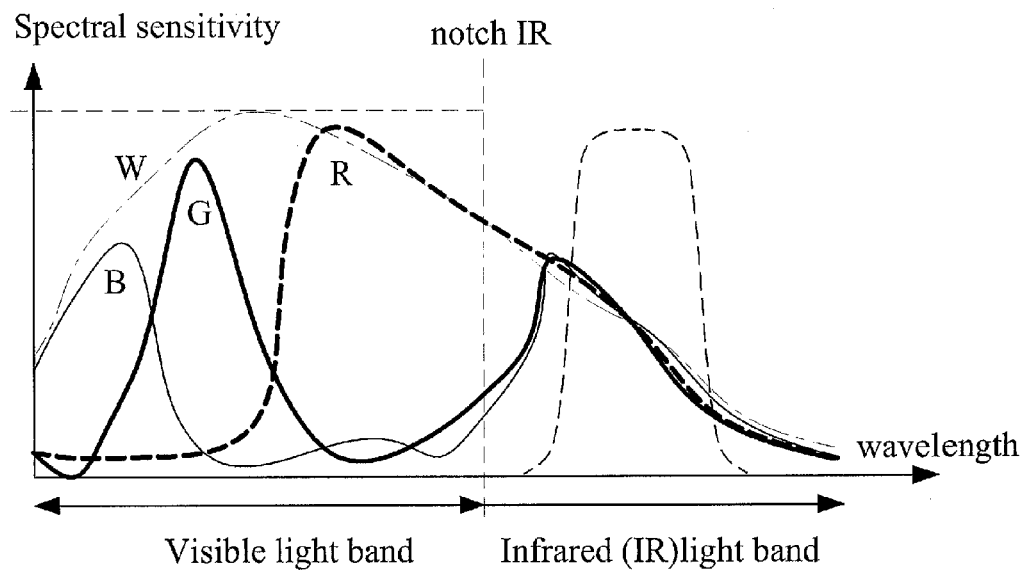
FIG. 2B shows another exemplary wavelength spectrum illustrating spectral sensitivity of R/G/B and W lights from a notch IR-cut filter.

FIG. 2A shows one exemplary wavelength spectrum illustrating spectral sensitivity of R/G/B and W lights 17 from the filter array 16. FIG. 2B shows another exemplary wavelength spectrum illustrating spectral sensitivity of R/G/B and W lights 17 using an IR-cut filter 14 that passes visible wavelengths (e.g., 380-700 nm) and infrared wavelengths within a notch-shaped band centered, for example, at 950 nm. The IR-cut filter 14 of FIG. 2B is therefore sometimes called a notch IR filter.

The color and white lights 17 from the filter array 16 are then converted to color signals and white signals 19, respectively, by photo sensors 181 of an image sensor 18 such as a complementary metal-oxide-semiconductor (CMOS) image sensor or CIS. Finally, the color signals and white signals 19 are then subjected to a color processing system 200, which may be performed, for example, by a processor such as an image processor.

Figure 3:
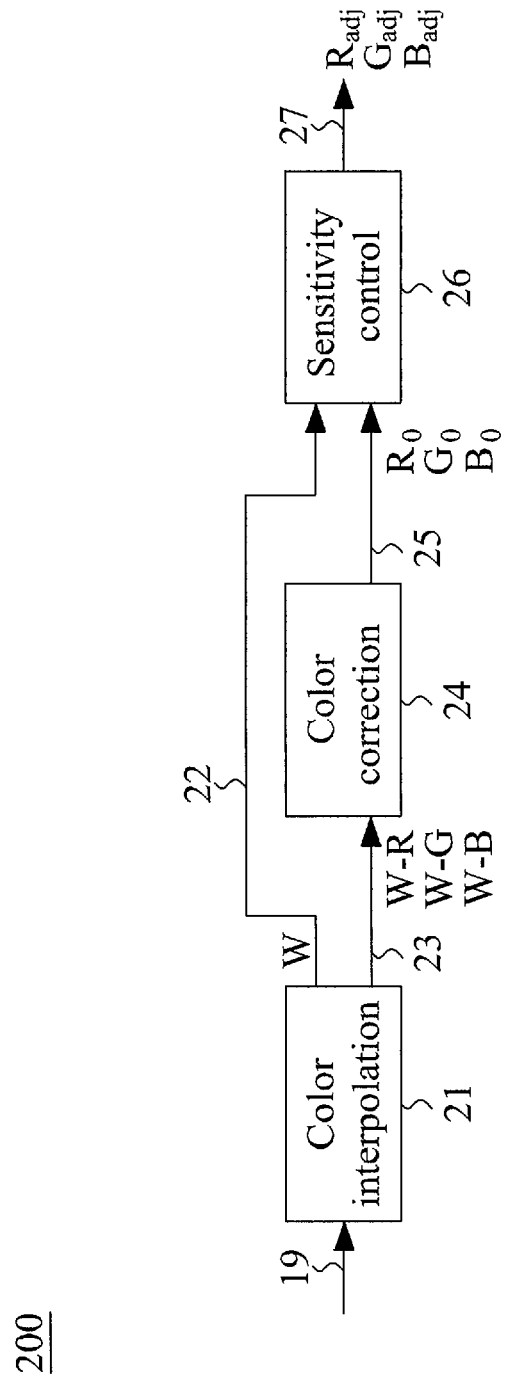
FIG. 3 shows a detailed block diagram of the color processing system of FIG. 2 according to the embodiment of the present invention.
Figures 4A, 4B:
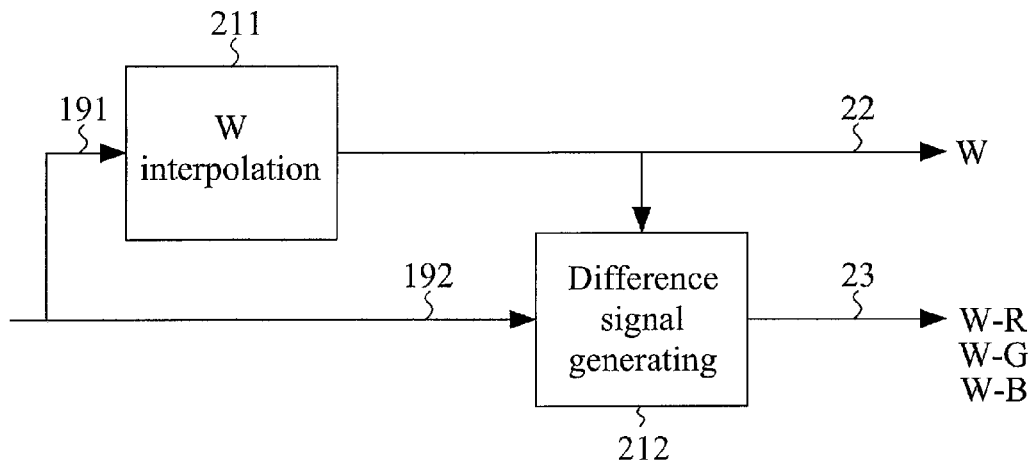
FIG. 4A shows a detailed block diagram of the color interpolation unit of FIG. 3.
FIG. 4B shows an exemplary filter array of FIG. 1.

FIG. 3 shows a detailed block diagram of the color processing system 200 of FIG. 2 according to the embodiment of the present invention. In the embodiment, a color interpolation unit 21 is coupled to receive the color and white signals 19 (from the image sensor 18) and accordingly generates interpolated white signals 22 and difference signals 23. In the specification, the term "difference signal" refers to a difference between a white signal and a color signal. For example, W−R denotes a difference signal 23 that is equal to the difference between a white signal and a red signal. FIG. 4A shows a detailed block diagram of the color interpolation unit 21 of FIG. 3. Specifically, the white signals 191 (from the photo sensors 181 corresponding to W filters) are subjected to a white interpolation subunit 211 in order to generate interpolated white signals 22 associated with non-white filters (e.g., R, G or B filters). Some examples, with respect to a filter array 16 illustrated in FIG. 4B, performed by the white interpolation subunit 211 are shown below:

$W@R5=(W1+W9)/2$ $W@B2=(W1+W3)/2$ $W@G6=(W1+W3+W9+W11)/4$

The color signals 192 (from the photo sensors 181 corresponding to color filters such as R/G/B filters) and the interpolated white signals 22 are subjected to a difference signal generating subunit 212 in order to generate the difference signals 23. Some examples, with respect to the filter array 16 illustrated in FIG. 4B, performed by the difference signal generating subunit 212 are shown below:

$W-R@R5=W@R5-R5$ $W-R@R7=W@R7-R7$ $W-R@G6=(W-R@R5+W-R@R7)/2$ $W-R@R13=W@R13-R13$ $W-R@R15=W@R15-R15$ $W-R@W9=(W-R@R5+W-R@R13)/2$ $W-R@B10=(W-R@R5+W-R@R7+W-R@R13+W-R@R15)/4$

It is noted that, in the embodiment, the difference signal 23 (e.g., W−R@G6) between a white signal and a red signal at a non-red pixel (e.g., G6) may be generated by interpolation on neighboring difference signals 23 (e.g., W−R@R5 and W−R@R7). The examples shown above are exemplified for generating the difference signals 23 between a white signal and a red signal. The difference signal generating subunit 212 may perform operations on color signals other than red signals in a similar manner.

It is appreciated, by observing the wavelength spectrum shown in FIG. 2A, that the difference signal W−R is approximately equal to a cyan (C) signal without significant infrared signal, the difference signal W−G is approximately equal to a magenta (M) signal without significant infrared signal, and the difference signal W−B is approximately equal to a yellow (Y) signal without significant infrared signal. In other words, the difference signal 23 from the color interpolation unit 21 has negligible infrared component for the reason that the color/white signals 19 have similar infrared light bands.

Figure 4C:
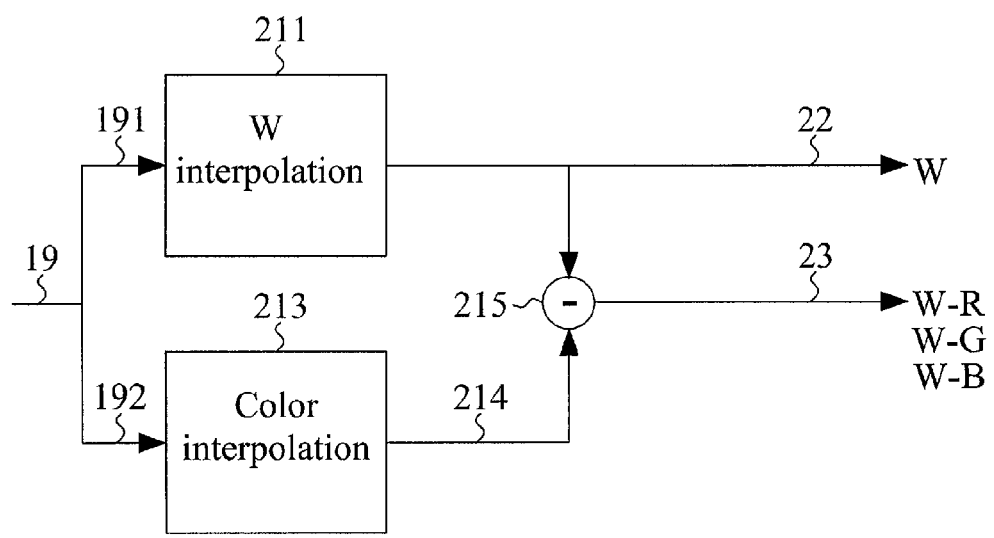
FIG. 4C shows another detailed block diagram of the color interpolation unit of FIG. 3.

FIG. 4C shows another detailed block diagram of the color interpolation unit 21 of FIG. 3. Specifically, the white signals 191 are subjected to the white interpolation subunit 211 in order to generate interpolated white signals 22 associated with non-white filter (e.g., R, G or B filters). The operation of the white interpolation subunit 211 has been described above in companion with FIG. 4A, and is thus omitted for brevity.

As shown in FIG. 4C, the color signals 192 are subjected to a color (e.g., R/G/B) interpolation subunit 213 in order to generate interpolated color signals 214. For example, red signals associated with non-red filter (e.g., G6 in FIG. 4B) may be generated by the color interpolation subunit 213, for example, by averaging neighboring red signals (e.g., red signals corresponding to R5 and R7). The interpolated color signal 214 may then be subtracted from the interpolated white signals 22, by a subtractor 215, therefore generating the difference signals 23.

Referring back to FIG. 3, a color correction unit 24 is configured to correct the difference signals 23, therefore resulting in corrected color signals 25 denoted, for example, as $R_o$, $G_o$ and $B_o$ for corrected red signals, corrected green signals and corrected blue signals, respectively. The color correction performed by the color correction unit 24 may be expressed as:

$$\begin{bmatrix} R_o \\ G_o \\ B_o \end{bmatrix} = \begin{bmatrix} D_{11} & D_{12} & D_{13} \\ D_{21} & D_{22} & D_{23} \\ D_{31} & D_{32} & D_{33} \end{bmatrix} \begin{bmatrix} W-R \\ W-G \\ W-B \end{bmatrix}$$

The corrected color signals $R_o$, $G_o$ and $B_o$ may be alternatively expressed as:

$$\begin{bmatrix} R_o \\ G_o \\ B_o \end{bmatrix} = \begin{bmatrix} C_{11} & C_{12} & C_{13} \\ C_{21} & C_{22} & C_{23} \\ C_{31} & C_{32} & C_{33} \end{bmatrix} \begin{bmatrix} R_V \\ G_V \\ B_V \end{bmatrix}$$

where $R_V$, $G_V$ and $B_V$ denote visual components of the red, green and blue signals, respectively.

For the two expressions illustrated above, assume the visual component of the white signal is equal to the sum of the visual component of the color signals (i.e., $W_V=R_V+G_V+B_V$), and the color/white signals have the same infrared components (i.e., $W_{IR}=R_{IR}=G_{IR}=B_{IR}$), if the elements $C_{11}$ to $C_{33}$ of the matrix C are given or obtainable, the elements $D_{11}$ to $D_{33}$ of the matrix D may then be obtained as follow:

$$D_{11} = \frac{C_{12}+C_{13}-C_{11}}{2}, D_{12} = \frac{C_{11}+C_{13}-C_{12}}{2}, D_{13} = \frac{C_{11}+C_{12}-C_{13}}{2}$$

$$D_{21} = \frac{C_{22}+C_{23}-C_{21}}{2}, D_{22} = \frac{C_{21}+C_{23}-C_{22}}{2}, D_{23} = \frac{C_{21}+C_{22}-C_{23}}{2}$$

$$D_{31} = \frac{C_{32}+C_{33}-C_{31}}{2}, D_{32} = \frac{C_{31}+C_{33}-C_{32}}{2}, D_{33} = \frac{C_{31}+C_{32}-C_{33}}{2}$$

In one embodiment, the matrix D may be decomposed into three matrices as follow:

$$\begin{bmatrix} D_{11} & D_{12} & D_{13} \\ D_{21} & D_{22} & D_{23} \\ D_{31} & D_{32} & D_{33} \end{bmatrix} = \begin{bmatrix} C_{11} & C_{12} & C_{13} \\ C_{21} & C_{22} & C_{23} \\ C_{31} & C_{32} & C_{33} \end{bmatrix} \begin{bmatrix} R_g & 0 & 0 \\ 0 & G_g & 0 \\ 0 & 0 & B_g \end{bmatrix} \begin{bmatrix} A_{11} & A_{12} & A_{13} \\ A_{21} & A_{22} & A_{23} \\ A_{31} & A_{32} & A_{33} \end{bmatrix}$$

where a matrix A represents quasi-CMY-to-RGB transform that transform difference signals (approximately equal to CMY signals) to an RGB space, and the matrix A may be selected to match a spectral response of a traditional RGB response; and a matrix $(R_g, G_g, B_g)$ may be a white balance gain for different illumination. In one example of using a RGBW filter array 16, the matrix A may be:

$$\begin{bmatrix} -0.5 & 0.5 & 0.5 \\ 0.5 & -0.5 & 0.5 \\ 0.5 & 0.5 & -0.5 \end{bmatrix}$$

Figure 5A:
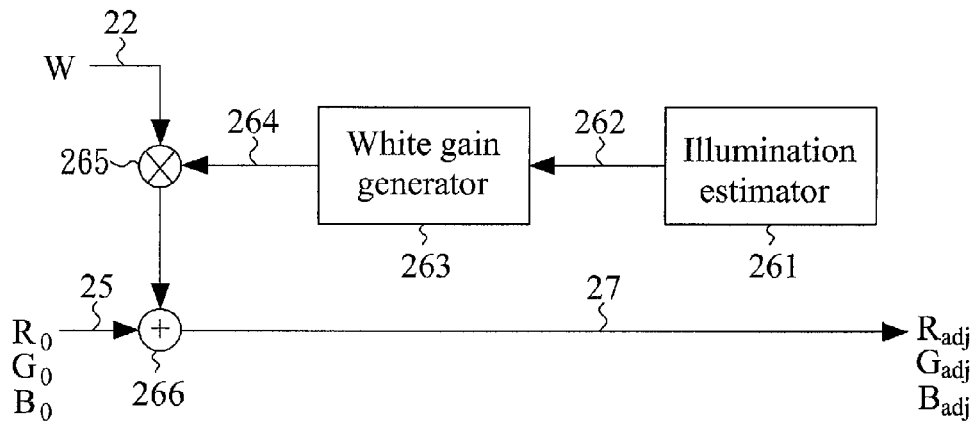
FIG. 5A shows a detailed block diagram of the sensitivity control unit of FIG. 3.

Referring back to FIG. 3, a sensitivity control unit 26 is configured to generate adjusted color signals 27 according to the corrected color signals 25 and the interpolated white signals 22 adaptable to illumination. FIG. 5A shows a detailed block diagram of the sensitivity control unit 26 of FIG. 3. Specifically, an illumination estimator 261 is utilized to estimate illumination surrounding the color processing apparatus 100. A white gain generator 263 then generates a gain value 264 according to the estimated illumination 262 from the illumination estimator 261. Generally speaking, the less the surrounding illumination is, the greater the gain value 264 is, and vice versa.

Figure 5B:
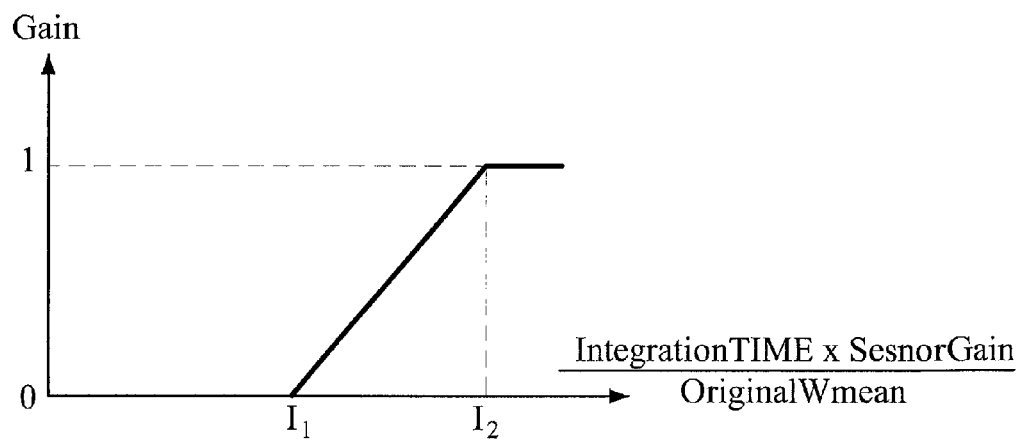
FIG. 5B shows an exemplary gain curve illustrating a generated gain value with respect to an estimated illumination.

FIG. 5B shows an exemplary gain curve illustrating the generated gain value 264 with respect to an illumination measure generated by multiplying an integration time (of the image sensor 18) by a gain of the image sensor 18 and then divided by a mean value of original (or non-interpolated) white signals. As illustrated in FIG. 5B, the generated gain value 264 is zero when the illumination measure is below a first threshold $I_1$, and the generated gain value 264 is one when the illumination measure is above a second threshold $I_2$, which is greater than the first threshold $I_1$. The generated gain value 264 monotonically increases from zero at the first threshold $I_1$ toward one at the second threshold $I_2$.

Still referring to FIG. 5A, the interpolated white signal 22 is then multiplied by the generated gain value 264 (by a multiplier 265), followed by adding to the corrected color signals 25 (by an adder 266), thereby generating the adjusted color signals 27 denoted, for example, as $R_{adj}$, $G_{adj}$ and $B_{adj}$ for adjusted red signals, adjusted green signals and adjusted blue signals, respectively. The operation performed by the sensitivity control unit 26 may be expressed as:

$$R_{adj}=R_o+\text{Gain}\cdot(W_V+W_{IR})$$

$$G_{adj}=G_o+\text{Gain}\cdot(W_V+W_{IR})$$

$$B_{adj}=B_o+\text{Gain}\cdot(W_V+W_{IR})$$

where $W_V$ represents visual component of the white signal, and $W_{IR}$ represents IR component of the white signal.

According to the sensitivity control unit 26 of the embodiment, the infrared component of the W signal may be adaptively introduced into the adjusted color signals 27, in a low-light condition, to improve the overall sensitivity, while no (or less) infrared component exists in the adjusted color signals 27, thereby preventing discoloring phenomenon.

Afterwards, adjusted color signals 27 obtained from the sensitivity control unit 26 may be subjected to further processing, for example, a gamma correction, which may be implemented by conventional techniques.

Although specific embodiments have been illustrated and described, it will be appreciated by those skilled in the art that various modifications may be made without departing from the scope of the present invention, which is intended to be limited solely by the appended claims.

What is claimed is:

1. A color processing system, comprising:
   a color interpolation unit coupled to receive color and white (W) signals and accordingly generate interpolated white signals and difference signals;
   a color correction unit configured to correct the difference signals, thereby resulting in corrected color signals; and
   a sensitivity control unit configured to generate adjusted color signals according to the corrected color signals, the interpolated white signals, and surrounding illumination;
   wherein the sensitivity control unit comprises:
      an illumination estimator configured to estimate surrounding illumination;
      a white gain generator configured to generate a gain value according to an output from the illumination estimator such that the less the surrounding illumination is, the greater the gain value is and vice versa;
      a multiplier configured to multiply the interpolated white signal by the gain value; and
      an adder configured to add an output of the multiplier to the corrected color signal, thereby generating the adjusted color signals.

2. The system of claim 1, wherein the color signals comprise a red (R) signal, a green (G) signal and a blue (B) signal; and the difference signals comprise W–R signal, W–G signal and W–B signal.

3. The system of claim 1, wherein the color interpolation unit comprises:
   a white interpolation subunit configured to generate the interpolated white signals according to the white signals; and
   a difference signal generating subunit configured to generate the difference signals according to the interpolated white signals and the color signals.

4. The system of claim 3, wherein the difference signal generating subunit generates the difference signal by interpolation on neighboring difference signals.

5. The system of claim 1, wherein the color interpolation unit comprises:

a white interpolation subunit configured to generate the interpolated white signals according to the white signals;

a color interpolation subunit configured to generate interpolated color signals according to the color signals; and a subtractor configured to subtract the interpolated color signals from the interpolated white signals, thereby generating the difference signals.

6. The system of claim 1, wherein the output of the illumination estimator is an illumination measure generated by multiplying an integration time of an image sensor by a gain of the image sensor and then divided by a mean value of the white signals.

7. The system of claim 6, wherein the gain value is zero when the illumination measure is below a first threshold; the gain value is one when the illumination measure is above a second threshold that is greater than the first threshold; and the gain value monotonically increases from zero at the first threshold toward one at the second threshold.

8. A color processing apparatus, comprising:

an infrared(IR)-cut filter coupled to filter a transmitted light, the IR-cut filter passing visible wavelengths and infrared wavelengths while blocking other wavelengths, thereby resulting in IR-cut filtered light;

a color and white filter array, which is composed of color filters and white filters, configured to filter the IR-cut filtered light, thereby resulting in color and white light;

an image sensor composed of photo sensors configured to convert the color and white light to color signals and white (W) signals, respectively;

a color interpolation unit coupled to receive the color and white signals and accordingly generate interpolated white signals and difference signals;

a color correction unit configured to correct the difference signals, thereby resulting in corrected color signals; and a sensitivity control unit configured to generate adjusted color signals according to the corrected color signals, the interpolated white signals, and surrounding illumination;

wherein the sensitivity control unit comprises:

an illumination estimator configured to estimate surrounding illumination;

a white gain generator configured to generate a gain value according to an output from the illumination estimator such that the less the surrounding illumination is, the greater the gain value is and vice versa;

a multiplier configured to multiply the interpolated white signal by the gain value; and an adder configured to add an output of the multiplier to the corrected color signal, thereby generating the adjusted color signals.

9. The apparatus of claim 8, wherein the color and white light has a wavelength spectrum ranging from 380 nm to 1000 nm.

10. The apparatus of claim 8, wherein the color and white light has a wavelength spectrum including a visible band ranging from 380 nm to 700 nm, and a notch-shaped infrared band separated from the visible band.

11. The apparatus of claim 8, further comprising a lens, through which an incident light is transmitted, thereby resulting in the transmitted light.

12. The apparatus of claim 8, wherein the color signals comprise a red (R) signal, a green (G) signal and a blue (B) signal; and the difference signals comprise W−R signal, W−G signal and W−B signal.

13. The apparatus of claim 8, wherein the color interpolation unit comprises:

a white interpolation subunit configured to generate the interpolated white signals according to the white signals; and a difference signal generating subunit configured to generate the difference signals according to the interpolated white signals and the color signals.

14. The apparatus of claim 13, wherein the difference signal generating subunit generates the difference signal by interpolation on neighboring difference signals.

15. The apparatus of claim 8, wherein the color interpolation unit comprises:

a white interpolation subunit configured to generate the interpolated white signals according to the white signals;

a color interpolation subunit configured to generate interpolated color signals according to the color signals; and a subtractor configured to subtract the interpolated color signals from the interpolated white signals, thereby generating the difference signals.

16. The apparatus of claim 8, wherein the output of the illumination estimator is an illumination measure generated by multiplying an integration time of an image sensor by a gain of the image sensor and then divided by a mean value of the white signals.

17. The apparatus of claim 16, wherein the gain value is zero when the illumination measure is below a first threshold; the gain value is one when the illumination measure is above a second threshold that is greater than the first threshold; and the gain value monotonically increases from zero at the first threshold toward one at the second threshold.

* * * * *